(12) United States Patent
Douglas et al.

(10) Patent No.: US 6,472,676 B1
(45) Date of Patent: Oct. 29, 2002

(54) MICROPOSITIONING SYSTEM

(75) Inventors: Anthony J Douglas, Preston (GB); Paul E Jarvis, Preston (GB); Kevin W Beggs, Blackpool (GB)

(73) Assignee: BAE Systems plc, Farnborough (GB)

( * ) Notice: Subject to any disclaimer, the term of this patent is extended or adjusted under 35 U.S.C. 154(b) by 0 days.

(21) Appl. No.: 09/700,880

(22) PCT Filed: Oct. 6, 2000

(86) PCT No.: PCT/GB00/03817

§ 371 (c)(1),
(2), (4) Date: Nov. 20, 2000

(87) PCT Pub. No.: WO01/27702

PCT Pub. Date: Apr. 19, 2001

(30) Foreign Application Priority Data

Oct. 9, 1999 (GB) ............................................. 9923795

(51) Int. Cl.$^7$ ............................. G01B 11/14; G06K 9/62
(52) U.S. Cl. ............................. 250/559.33; 250/559.29; 250/559.3; 250/208.1; 356/614; 356/615
(58) Field of Search ........................ 250/559.29, 559.3, 250/559.33, 208.1; 356/614, 615

(56) References Cited

U.S. PATENT DOCUMENTS

| 3,795,449 A | * | 3/1974 | McKay, Sr. | 356/621 |
| 4,453,085 A | | 6/1984 | Pryor | 250/203.1 |
| 4,468,695 A | | 8/1984 | Ikeda et al. | 348/94 |

(List continued on next page.)

FOREIGN PATENT DOCUMENTS

| EP | 0 331 108 | 9/1989 |
| EP | 0 433 803 | 6/1991 |
| EP | 0 435 239 | 7/1991 |
| EP | 0 902 345 | 3/1999 |
| FR | 2 707 017 | 12/1994 |
| GB | 2 104 652 | 3/1983 |
| GB | 2 287 598 | 9/1995 |
| JP | 6175725 | 6/1994 |
| WO | WO 97/10925 | 3/1997 |

*Primary Examiner*—Robert H. Kim
*Assistant Examiner*—Allen C Ho
(74) *Attorney, Agent, or Firm*—Nixon & Vanderhye P.C.

(57) ABSTRACT

The present invention provides an apparatus and a method for accurately positioning tools for use in manufacturing or inspection operations whilst reducing the need for costly tooling such as jigs.

The method for accurately positioning tools comprises at least the steps of
projecting an image onto a surface, detecting the projected image, processing the projected image, calculating at least two dimensional co-ordinates of the projected image relative to a tool, and moving the tool so that it is positioned in a pre-defined spacial relationship with respect to the projected image.

The micropositioning system comprises
a radiation source for projecting an image onto a surface, a radiation detector for detecting the projected image, tool conveyancing means for carrying a tool, processor means for calculating at least two dimensional co-ordinates of the projected image detected by the radiation detector relative to the tool, and control means for controlling the tool conveyancing means so as to position the tool in a pre-defined spacial relationship with the projected image in response to a signal from the processor means.

24 Claims, 4 Drawing Sheets

U.S. PATENT DOCUMENTS

| | | | | |
|---|---|---|---|---|
| 4,523,100 A | * | 6/1985 | Payne | 250/559.33 |
| 4,611,292 A | | 9/1986 | Ninomiya et al. | 702/153 |
| 4,647,208 A | * | 3/1987 | Bieman | 356/615 |
| 4,654,949 A | | 4/1987 | Pryor | 250/203 R |
| 4,720,870 A | | 1/1988 | Billiotte et al. | 382/145 |
| 4,744,664 A | * | 5/1988 | Offt et al. | 356/615 |
| 5,146,965 A | * | 9/1992 | Gibson | 144/372 |
| 5,160,977 A | | 11/1992 | Utsumi | 356/606 |
| 5,172,326 A | * | 12/1992 | Campbell, Jr. et al. | 700/134 |
| 5,198,876 A | | 3/1993 | Anezaki et al. | 382/106 |
| 5,362,970 A | | 11/1994 | Pryor et al. | 250/559.08 |
| 5,446,635 A | | 8/1995 | Jehn | 362/259 |
| 5,633,707 A | | 5/1997 | Seemann | 356/35.5 |
| 5,663,885 A | | 9/1997 | Stahl | 700/134 |
| 5,666,202 A | * | 9/1997 | Kyrazis | 356/614 |
| 5,768,792 A | * | 6/1998 | Raab | 33/503 |
| 5,778,548 A | | 7/1998 | Cerruti | |
| 5,822,209 A | * | 10/1998 | Fischer | 700/160 |
| 6,090,158 A | * | 7/2000 | McLaughlin | 8/400 |
| 6,292,715 B1 | * | 9/2001 | Rongo | 700/249 |
| 6,317,953 B1 | * | 11/2001 | Pryor | 29/407.04 |
| 6,337,489 B1 | * | 1/2002 | Matsumoto et al. | 250/559.08 |

\* cited by examiner

MICROPOSITIONING SYSTEM

BACKGROUND OF THE INVENTION

1. Field of the Invention

This invention relates to the general field of manufacturing and more particularly to the positioning of tools for carrying out manufacturing or inspection operations.

2. Discussion of Prior Arts

In a manufacturing environment, it is generally necessary to perform operations such as measuring, drilling, cutting, countersinking, and inspecting, for example. Tools for carrying out these operations need to be positioned prior to performing their function.

The accuracy with which the tools are positioned is dependent upon the level of accuracy required in the finished product. For example, in aircraft manufacture, many components need to be produced to very high standards of accuracy, and are often fitted and finished by hand to meet the required tolerances.

Traditionally, articles being manufactured would be marked up by hand, to show where holes should be drilled or the material should be cut for example. This method is time consuming and costly, as it relies heavily on skilled labor. More recently, articles have been held in jigs or other fixtures designed to hold a particular article in a desired position whilst it is machined or inspected using, for example, a numerically controlled machine.

Summary of the invention

For smaller batches of articles, it is often prohibitively expensive to obtain the tooling, such as jigs or other fixtures, which permits highly accurate manufacture of the articles.

The present invention seeks to alleviate the problem. of expense associated with the known tool positioning methods described above, by providing an apparatus and a method for accurately positioning tools for use in manufacturing or inspection operations whilst reducing the need for costly tooling such as jigs.

According to the present invention there is provided:

A micropositioning system comprising:

- a radiation source for projecting an image onto a surface of an article, the image being part of a manufacturing template and the image representing a predetermined position on the surface of the article where a manufacturing or inspection operation is to be undertaken;
- a radiation detector for detecting the projected image;
- tool conveyancing means for carrying a tool adapted to perform manufacturing or inspection operations;
- processor means for calculating at least two dimensional co-ordinates of the projected image detected by the radiation detector relative to the tool; and
- control means for controlling the tool conveyancing means so as to position the tool in a predefined spacial relationship with the projected image in response to a signal from the processor means.

Advantageously the information contained within the manufacturing template is obtained directly from a CAD model of the article.

The radiation source may be a laser. Advantageously the radiation source provides radiation visible to the human eye so that an operator may view the image. The radiation source may be for example a Virtek Laseredge 3D laser projection system. Two radiation sources may be used for complex surfaces.

The radiation source may project an image in the form of an ellipse. The radiation source may alternatively project an image in the form of a cross, or a circle. The image is preferably of a size in the range 0.5 to 3.0 cm.

The image is projected onto a surface at a location where a manufacturing or inspection operation is to be carried out. Several images may be simultaneously projected to provide, for example, a drill template on a surface such as an aircraft panel.

The radiation detector preferably comprises a camera and an image processing system. The camera may comprise an array of solid state charge coupled devices (CCDs). The array may be linear or rectangular. The CCDs produce a charge proportional to the amount of light falling on them and the charge from each device in the array is preferably used by the image processing system to build up an image.

The image processing system preferably comprises a frame grabber for digitising the image and a computer adapted for processing the image.

The image is advantageously processed by the computer to identify features such as areas of the same intensity or changes in intensity, for example. The image processor advantageously is thereby able to identify an image such as a cross projected by the radiation source, and locate the centre of the image.

The tool conveyancing means may comprise a tool holding device, for example, a chuck. The tool conveyancing means preferably further comprises a moveable stage. The tool holding device is advantageously mounted on the moveable stage. The moveable stage is preferably able to move in at least x and y directions, where the x and y directions are normal to each other and are in one plane (the x-y plane). The moveable stage may be servo motor actuated. The moveable stage may additionally be able to move in a z direction, where the z direction is normal to the x-y plane. Alternatively the tool holding device may be adapted to move in the z direction. The tool holding device is advantageously mounted to the moveable stage in a manner such that the tool holding device may move relative to the moveable stage in the z direction.

The moveable stage is preferably mounted on a platform, such that it is able to move relative to the platform. The platform preferably comprises attachment means for allowing the platform to be releasably attached to the surface. The attachment means may comprise a vacuum sucker. The vacuum sucker may comprise a rubber seal and venturi ejector vacuum pump. Alternatively the attachment means may comprise a magnetic portion, if the surface is ferrous. Alternatively the attachment means may comprise a mechanical fastener, such as a bolt or clamp, for example.

The platform may comprise one or more adjustable feet for allowing the micropositioning system to operate on curved or uneven surfaces. The adjustable feet are preferably individually adjustable, and are for adjusting the distance between the surface and the platform. The adjustable feet may be manually or automatically adjustable, and may utilise hydraulic or electrical jacks, or telescopic or screw thread mechanical arrangements.

The micropositioning system preferably comprises normalisation means for checking that the tool is substantially normal to the surface prior to a manufacturing operation being carried out. The normalisation means may automatically control the adjustable feet to ensure that the platform is stable with respect to the surface and to alter the orientation of the platform and with it the inclination of the tool.

The normalisation means may comprise a sensor such as, for example, a linear potentiometer. The normalisation means may comprise at least two sensors located on the platform in a manner such that, in use, the sensors are adjacent the surface. Alternatively the normalisation means may comprise a sensor such as, for example, a radiation source and reflected radiation detector system, where at least two such sensors are located on the platform such that, in use, the sensors are perpendicular to the surface. The sensors are preferably used to determine if the moveable stage of the platform is substantially parallel to the surface in cases where the surface is substantially flat, or in the case of a curved surface, whether the moveable stage mounted on the platform is substantially tangential to the surface. The normalisation means may further comprise a tool normalisation aid for checking that the tool is normal to the moveable stage.

The processor means advantageously uses data obtained from the image processing system to determine the location of the image with respect to the position of the tool.

The control means may comprise a servo motor and a motion controller.

The control means preferably comprises at least two servo motors, at least one for actuating movement of the moveable stage in the x direction and at least one for actuating movement of the moveable stage in the y direction.

The motion controller advantageously controls the movement of the moveable stage in at least the x and y directions.

The control means may further comprise a servo motor for actuating movement of the tool holder in the z direction. The motion controller may control the movement of the tool holder in the z direction.

The processor means are adapted to communicate with the control means.

The tool conveyancing means may comprise an extendable arm for holding a tool. The tool may be a drill. Alternatively the tool may be a milling tool or a grinding tool or a welding tool or a rivet insertion tool. Alternatively the tool may be an inspection tool or a non destructive testing tool. Alternatively the tool may be a spray gun or blast gun.

A camera may be provided on the tool holder, for sending a 'tool's eye view' to a monitor visible to the micropositioning device operator. The operator is then able to visually verify that the operation is being carded out on the surface correctly and at the place where the image is being projected.

The platform, moveable plate and tool holding means are preferably mainly manufactured from a material having light weight and good strength, for example, aluminum alloy or carbon fibre composite.

A handle is preferably provided on the platform for enabling an operator to position the platform on the surface to drilled.

According to the present invention in another aspect thereof, there is provided a method for accurately positioning tools comprising at least the steps of:

projecting an image onto a surface of an article, the image being part of a manufacturing template and the image representing a predetermined position on the surface of the article where a manufacturing or inspection operation is to be undertaken;

detecting the projected image;

processing the projected image;

calculating at least two dimensional co-ordinates of the projected image relative to a tool adapted to perform manufacturing or inspection operations; and moving the tool so that it is positioned in a predefined spacial relationship with respect to the projected image.

During processing of the image, preferably a feature such as an area having a greater intensity than its surroundings is identified by an image processing system. The centre of the area may then be determined by the image processing system. Alternatively a feature such as a change in intensity between adjacent areas may be identified by the image processing system, corresponding to a boundary of a projected image.

Preferably the image processing system locates the centre of the projected image. The two dimensional co-ordinates of the centre of the projected image relative to a tool are then advantageously calculated by a processor.

To assist the image processing system, the lighting is preferably controlled to give a high contrast between the projected image on the surface and the rest of the surface. Advantageously, the lighting is chosen to minimise unwanted reflections, shadows, and other uneven illumination.

Advantageously the tool is manoeuvrable in the x, y and z directions, where the x and y directions preferably represent a two dimensional plane substantially parallel or tangential to the surface and the z direction is normal to the x, y plane.

The tool is preferably held in an x, y plane substantially parallel or tangential to the surface, and displaced in the z direction toward or away from the surface. Advantageously prior to use the tool is normalised so that in use its line of action is normal to the surface.

Following calculation of the two dimensional co-ordinates of the centre of the projected image relative to the tool, the processor sends a signal to cause the tool to be moved in the x, y plane so that it is located at the same x, y co-ordinates as the centre of the projected image. The motion of the tool in the x, y plane is preferably achieved by a servo motor. Advantageously one servo motor controls movement in the x direction and one motor controls movement in the y direction. The servo motors are preferably controlled by a motion controller which receives move command instructions from the processor. The processor works out how the tool needs to move in the x and y directions to be at the same x and y coordinates as the centre of the image and then instructs the motion controller to actuate the servo motors to achieve this movement.

Feedback from the servo motors allows an operator to confirm that the tool has moved to the required x, y position.

When the tool is in the required x, y position the tool is then automatically displaced in the z direction, and enabled to carry out its operation.

The movement of the tool in the z direction may be achieved for example by a pneumatic cylinder or by a servo motor. The rate of movement in the z direction of the tool is preferably controlled by an adjustable spring damper unit.

Advantageously the platform is releasably attached to the surface by the operator prior to undertaking a manufacturing operation.

After projecting an image onto the surface, the operator may position the platform adjacent the projected image. The operator then preferably checks that the platform is positioned correctly. This check may be undertaken using normalisation sensors. Preferably the tool is prevented from operating when the normalisation sensors indicate that the platform is not positioned correctly. The normalisation sensors may control the movement of adjustable feet to ensure that the platform is stable with respect to the surface, and to alter the orientation of the platform. Alternatively the operator may manually control the movement of the adjustable feet.

Prior to a manufacturing operation being undertaken, the micropositioning system is preferably calibrated to allow the x, y co-ordinates within the field of view of the radiation detector to be linked to the x, y position of the tool. This allows the processor, once the x, y co-ordinates of an image within the field of view of the radiation detector has been determined, to work out the distance the tool needs to move in the x and y directions in order to be positioned at the same x, y coordinates as the image.

Preferably, following a manufacturing operation, the operator is able to visually inspect the result of the operation on a monitor, the monitor receiving an image of the surface from a camera located adjacent the tool.

BRIEF DESCRIPTION OF THE DRAWINGS

An embodiment of the present invention will now be described by way of example only and with reference to the following drawings of which.

DETAILED DISCUSSION OF EMBODIMENTS

Figure 1:
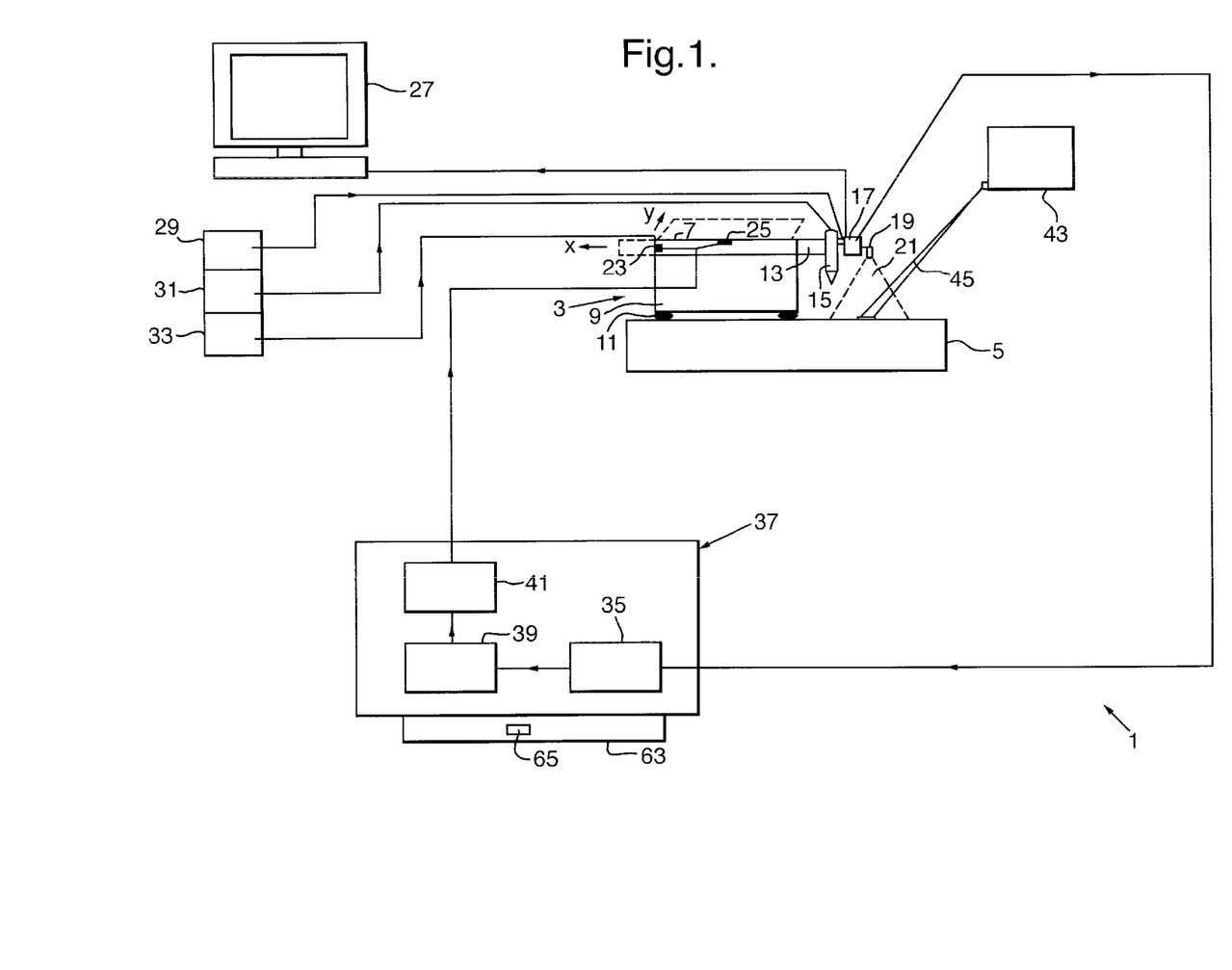
FIG. 1 shows a schematic diagram of the system according to the present invention.

FIG. 1 shows a schematic diagram of a micropositioning system 1 in accordance with the present invention. A micropositioning unit 3 is placed on a surface 5. The surface 5 is an aircraft panel curved to match the fuselage profile, the radius of curvature being 2m. The micropositioning unit comprises a moveable stage 7 mounted on a platform 9. The platform 9 has vacuum suckers 11 attached to its underside for releasably attaching the platform 9 to the surface 5. A tool holder 13 is mounted on the moveable stage 7. A tool 15 is held in the tool holder 13. A camera 17 and a light source 19 are mounted adjacent the tool 15, the light source 19 projecting a beam 21 onto the surface 5. The moveable stage 7 is operable by an x direction servo motor 23 and a y direction servo motor 25, where the x and y directions are substantially in the same plane as the moveable stage. The camera 17 is connected to a monitor 27 and to a camera power source 29. The tool 15 is connected to a tool power source 31 and the micropositioning unit 3 is connected to a unit power source 33. The camera 17 is also connected to an image processor 35 that forms part of a processing unit 37. The processing unit 37 further comprises a processor 39, a control panel 63, and a motion controller 41. The motion controller controls the x and y direction servo motors, 23 and 25 respectively. The control panel 63 comprises operator controls, such as button 65.

A laser projector 43 is positioned to project a beam of radiation 45 onto surface 5, adjacent the micropositioning unit 3.

Figure 2:
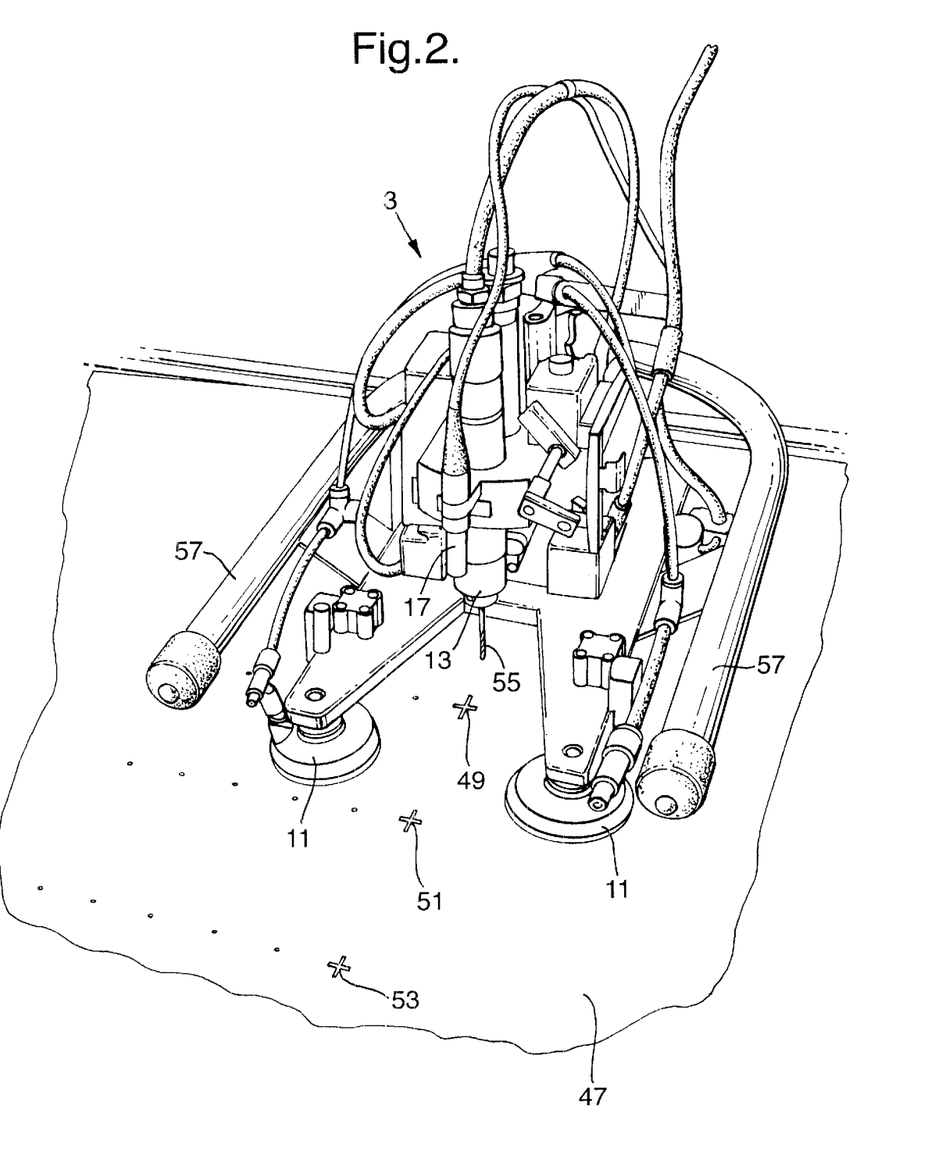
FIG. 2 shows an isometric view of the micropositioning unit part of the system.

FIG. 2 shows an isometric view of the micropositioning unit 3 positioned on the surface of an aircraft panel 47. The laser projector (not shown) is projecting a row of three crosses 49, 51, 53 onto the panel 47. The micropositioning unit is releasably attached to the panel 47 by vacuum suckers 11. A drill 55 is held by the tool holder 13, and a camera 17 is mounted adjacent drill 55. A handle 57 is provided on the micropositioning unit 3 for allowing an operator to lift the unit 3 more easily.

Figure 3:
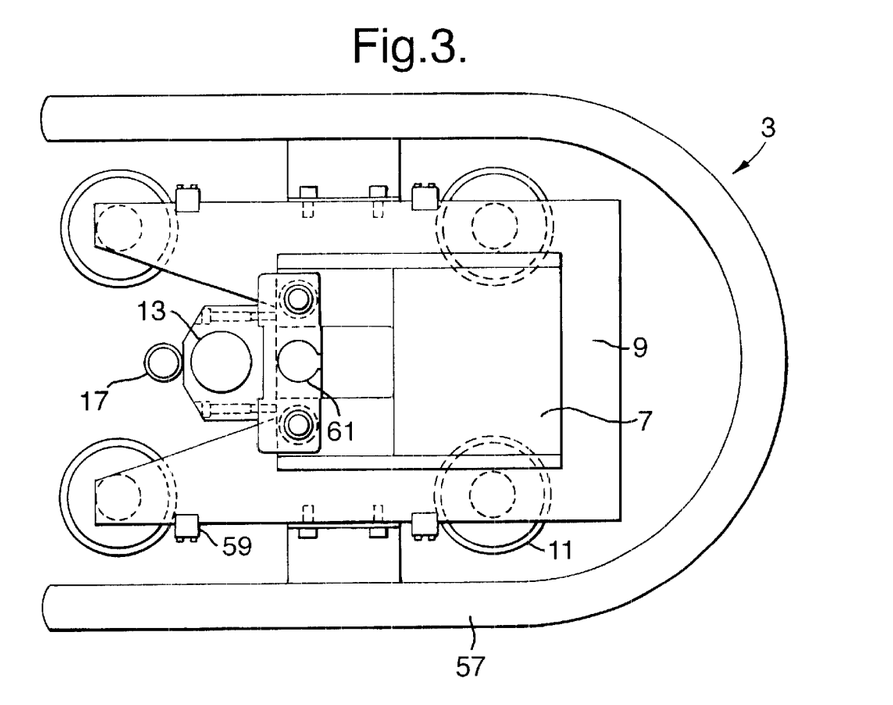
FIG. 3 shows a plan view of a part of the system.

FIG. 3 shows a plan view of the micropositioning unit 3. The unit 3 has four vacuum suckers 11 on its base for releasably attaching the platform 9 to a surface. The unit 3 also has normalisation sensors 59 adjacent the vacuum suckers 11 for ensuring that the platform 9 and associated moveable stage 7 are parallel or tangential with respect to a surface. The unit 3 also comprises a tool control means 61 for controlling the z direction movement of a tool held in the tool holder 13, and a moveable stage 7 for moving the tool in the x and y directions. The z direction is substantially normal to the plane of the moveable stage.

Figure 4:
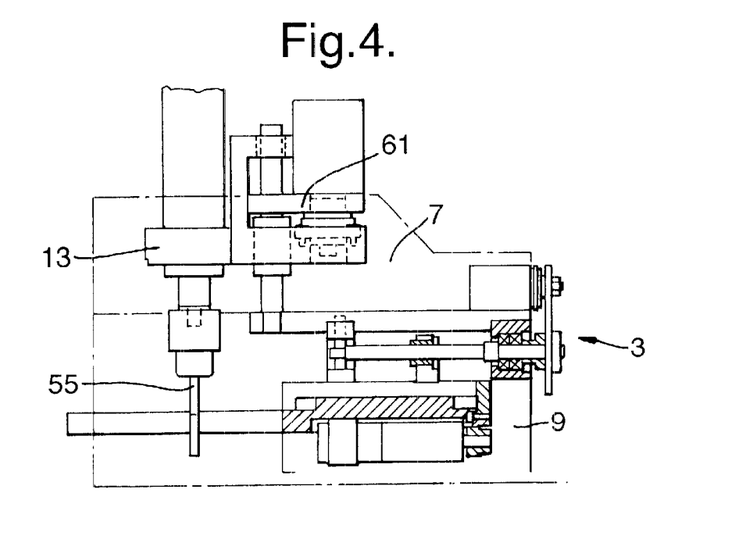
FIG. 4 shows a side view of the part of the system shown in FIG. 2.
Figure 5:
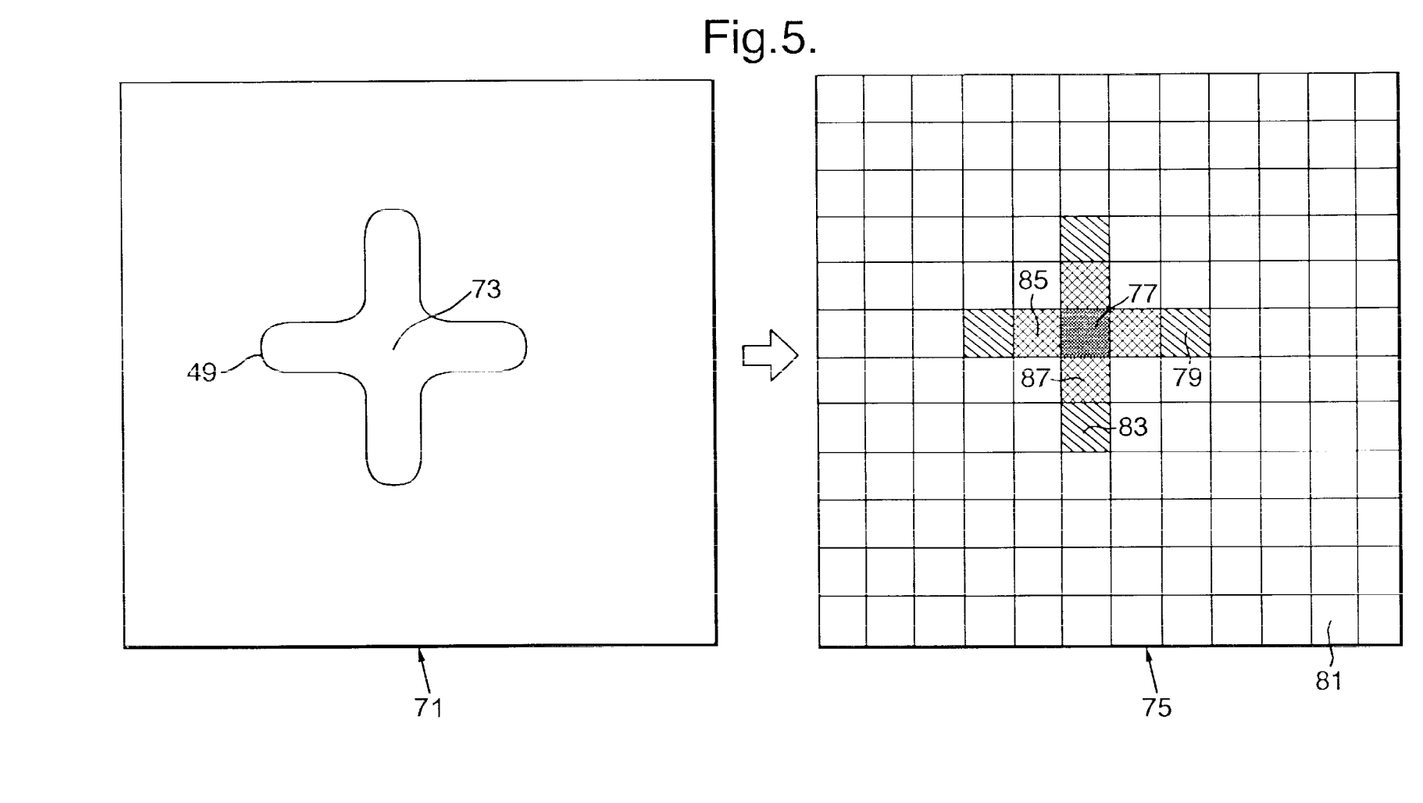
FIG. 5 shows an image projected by the system.

FIG. 4 shows a side view of part of the micropositioning unit 3 of FIG. 5. A drill 55 is held in a tool holder 13. The tool holder 13 is mounted on a moveable stage 7, the moveable stage 7 being mounted on a platform 9. Tool control means 61 controls the z direction movement of the drill 55.

With regard to FIGS. 1–4, in use, the micropositioning system 1 is positioned near to a surface on which a machining or inspecting operation is to be carried out. The surface is preferably substantially flat and may have a curvature radius of 2 m or over. In this example, the surface is an aircraft panel 47. For another embodiment, which utilises adjustable feet, the curvature radius may be significantly smaller than 2m.

The laser projector 43 projects a beam of radiation 45 in the form of a cross 49 onto the aircraft panel 47. The aircraft panel 47 is held in a jig (not shown) which has been datumed so that the precise position of the panel is known with respect to the laser projector and so the cross 49 is projected onto the exact part of the panel 47 which needs to be drilled. The laser projector may project several crosses, as a drill template, onto the panel 47 if several drilling operations are required. The laser projector 43 takes its drill template from the CAD model of the aircraft panel 47.

An operator then manually positions the micropositioning unit 3 near to a projected cross 49, and uses the normalisation sensors 59 to ensure that the micropositioning unit 3 is positioned such that the moveable stage 7 is substantially parallel or tangential to the aircraft panel 47. The cross 49 should be within the field of view of the camera 17. A light source 19, such as a small torch, is mounted adjacent the camera 17 and is set to project light 21 onto the panel 47 to indicate the field of view of the camera 17. The operator can then easily see whether the cross 49 is within the field of view of the camera 17.

The micropositioning unit 3 has a green light and a red light associated with the normalisation sensors 59. If the normalisation sensors 59 indicate that the unit is not correctly positioned, the red light comes on, and the operator is prevented from moving the drill 55 in the z direction. The operator must then adjust the unit until the green light comes on, indicating that the unit 3 is positioned correctly.

The unit 3 is then releasably clamped to the panel 47 using the vacuum suckers 11 on the platform 9 of the unit 3. The vacuum is activated by the operator pressing a button (not shown) on the unit 3.

The operator is able to see the "camera's eye view" of the panel 47 on the monitor 27, which receives images from the camera 17. When the operator is happy with the position of the micropositioning unit 3, he activates the drilling process by pressing a button 65 located on the processing unit control panel 63. The camera 17 then captures an image of the cross 49 on the panel 47 and the image processor 35 identifies the cross 49 and calculates its centre. This technique is described further with reference to FIG. 5.

The processor 39 then calculates the relative position of the centre of the cross 49 with respect to the drill 55 and calculates the distance the drill 55 needs to move in the x and y directions to be positioned at the same x and y co-ordinates as the centre of the cross 49. The processor 39 imparts this information to the motion controller 41, which controls the operation of the x and y direction servo motors 23, 25 that move the moveable stage 7.

Before using the micropositioning system 1, the tool 15 is positioned in the tool holder 13 such that the tool 15 will be normal to the surface of the panel 47 when the platform 9 and associated moveable stage 7 are substantially parallel or tangential to the surface of the panel 47. The normalisation sensors 59 that indicate whether the platform 9 is substantially parallel or tangential to a surface will thereby also indicate whether the tool 15 is normal to the surface. The tool holder 13 is. mounted onto the moveable stage 7, and may have an extensible arm. In this example the tool holder 13 has no extensible arm.

The servo motors 23, 25 move the moveable stage 7 until the drill bit is positioned at the same x, y co-ordinates as the centre of the cross 49. The drill 55 is then started automatically and moved in the z direction to drill a hole into the panel 47 through the centre of the cross 49. The drill 55 is then retracted so that the camera 17 can display a live image of the cross and the hole on the monitor 27. The operator can then inspect the hole using the monitor 27 to confirm that the hole was drilled in the correct place.

FIG. 5 shows the field of view 71 of the camera 17. A cross 49 is projected by the laser projector 43 onto a surface. The cross has a centre 73. The camera 17 uses an array of charge coupled devices (CCDs) which produce a charge proportional to the light falling on them. The array may be linear or rectangular. The charge from each device in the array is used to build up an image 75 comprising numerous pixels 79, 81 where each CCD corresponds to a pixel. The intensity of each pixel corresponds to the charge generated by the corresponding CCD. A monitor 27 is used to display the image to allow the operator to check that the cross 49 is in the correct position. The image 75 corresponds to the field of view 71 of the camera 17.

Where a projected cross is present on a portion of the surface, the CCDs directed at that portion of the surface receive more illumination then those CCDs directed at portions of the surface that do not have a cross projected onto them. The CCDs receiving illumination from the projected cross generate a higher charge output than those not receiving illumination, and so the corresponding image 75 comprises pixels of greater intensity 79 and pixels of lower intensity 81, the pixels of greater intensity forming an image of the cross 77. The pixels at the extremities 79, 83 of the image of the cross 77 are of lower intensity than those closer to the centre of the image of the cross 85, 87 as the CCDs directed at the extremities of the projected cross do not receive as much illumination as those directed at the centre of the projected cross.

The image 75 is processed by the image processor 35. The image 75 can be processed to identify various features such as areas of the same intensity, for example a 'blob' of light or changes in intensity, as for example at an edge of a projected feature.

The image processing algorithm used to identify and locate the centre of a projected cross is as follows:

a) The image 75 is 'thresholded' to leave only those pixels above a certain intensity. In the example of FIG. 5, the intensity threshold would be set to eliminate the lower intensity pixels 81 and those pixels at the extremities of the image of the cross.

b) Adjacent pixels above the threshold are joined to form clusters or blobs.

c) A bounding box is defined around each blob.

d) A series of statistics are calculated for each blob including:
the centre
the centre of gravity
the size e) All blobs below a pre-set size are discarded.

f) The largest blob is chosen as the detected feature.

g) The bounding box is shrunk by 20%.

h) The centre of gravity along each edge of the bounding box is located.

i) Two lines passing through the centre of gravity on each side are constructed, and their point of intersection determined.

j) The point of intersection is the x, y co-ordinates sent to the processor 39, which then calculates this position relative to the position of the drill and this information is used by the motion controller 41 to control the x, y servo motors 23, 25 that physically position the drill 55 at the same x, y co-ordinates as the point of intersection.

The laser projector may project features other than crosses, for example circular or elliptical blobs. In this case, the image processing algorithm follows a similar process to that described for the cross up to and including step f, but then the x, y co-ordinates of the centre of gravity of the largest blob are determined and these x, y co-ordinates are sent to the processor.

The image processing can be made much easier and more accurate by careful control of the environment to improve the image and simplify the analysis. This can be assisted by controlling the lighting, for example, to ensure that the lighting is constant over the surface with no reflections or shadows and that there is a reasonable difference in intensity between the projected feature and the background lighting. Providing a datum for the article being manufactured or inspected and establishing the position of the article with respect to the radiation source before utilising the present invention is also important, as the feature must be projected onto the correct part of a surface. Also the distance between the camera and the article needs to be known to ascertain the scale, and the position of the drill with respect to the field of view of the camera must also be known. A link into the CAD model of the article can be used to relate the contents of the image to the article. The article may be clamped to a work table, and its position relative to the radiation source can then be determined using known positioning techniques prior to projecting the image, thereby reducing the need for jigs.

Various modifications to the above system may now suggest themselves to those skilled in the art, such as the use of various manufacturing or inspection tools with the micropositioning system, for example probes and other tools used in non destructive testing. The adaptation of the system to be able to identify position in the z direction as well as the x and y directions may also be achieved by the use of two cameras. Also, the base of the micropositioning unit may contain wheels or casters to assist with positioning, adjustable feet to allow improved operation on curved surfaces, and means other than vacuum suckers for releasably securing the unit to a surface, such as claps or electro magnetic devices, for example, may be used.

What is claimed is:

1. A micropositioning system for carrying out manufacturing or inspection operations on an article, said system comprising:
a radiation source for projecting an image onto a surface of said article, the image being part of a manufacturing template obtained directly from a CAD model of the article and the image representing a predetermined position on the surface of the article where said manufacturing or inspection operations are to be undertaken;
a radiation detector for detecting the projected image;
tool conveyancing means for carrying a tool adapted to perform said manufacturing or inspection operations;
processor means for calculating at least two dimensional co-ordinates of the projected image detected by the radiation detector relative to the tool and
control means for controlling the tool conveyancing means so as to position the tool in a pre-defined spatial relationship with the projected image in response to a signal from the processor means.

2. A micropositioning system as claimed in claim 1 wherein the radiation detector comprises a camera and an image processing system.

3. A micropositioning system as claimed in claim 2 wherein the camera comprises an array of solid state charge coupled devices.

4. A micropositioning system as claimed in claim 2 wherein the image processing system comprises a frame grabber for digitising the image and a computer adapted for processing the image.

5. A micropositioning system as claimed in claim 4 wherein the image is processed by the computer to identify features such as areas of the same intensity or changes in intensity.

6. A micropositioning system as claimed in claim 5 wherein the image is processed by the computer to locate the centre of the image.

7. A micropositioning system as claimed in claim 1 wherein the tool conveyancing means comprises a tool holding device mounted on a moveable stage.

8. A micropositioning system as claimed in claim 7 wherein the moveable stage is mounted on a platform.

9. A micropositioning system as claimed in claim 7 the tool holding device is adapted to move relative to the moveable stage.

10. A micropositioning system as claimed in claim 1 wherein the micropositioning system comprises normalisation means for checking that the tool is substantially normal to the surface prior to a manufacturing operation being carried out.

11. A micropositioning system as claimed in claim 1 wherein the processor means uses data obtained from an image processing system to determine the location of the image with respect to the position of the tool.

12. A micropositioning system as claimed in claim wherein the control means comprises a motion controller for controlling the movement of the tool conveyancing means.

13. A micropositioning system as claimed in claim 12 wherein the control means further comprises a servo motor.

14. A micropositioning system comprising:
a radiation source for projecting an image onto a surface of an article, the image being part of a manufacturing template and the image representing a predetermined position on the surface of the article where a manufacturing or inspection operation is to be undertaken;
a radiation detector for detecting the projected image;
tool conveyancing means for carrying a tool adapted to perform manufacturing or inspection operations;
processor means for calculating at least two dimensional co-ordinates of the projected image detected by the radiation detector relative to the tool and
control means for controlling the tool conveyancing means so as to position the tool in a pre-defined spatial relationship with the projected image in response to a signal from the processor means,
wherein the tool conveyancing means comprises a tool holding device mounted on a moveable stage, and the moveable stage is mounted on a platform,
wherein the platform comprises attachment means for allowing the platform to be releasably attached to the surface.

15. A micropositioning system comprising:
a radiation source for projecting an image onto a surface of an article, the image being part of a manufacturing template and the image representing a predetermined position on the surface of the article where a manufacturing or inspection operation is to be undertaken;
a radiation detector for detecting the projected image;
tool conveyancing means for carrying a tool adapted to perform manufacturing or inspection operations;
processor means for calculating at least two dimensional co-ordinates of the projected image detected by the radiation detector relative to the tool and control means for controlling the tool conveyancing means so as to position the tool in a pre-defined spatial relationship with the projected image in response to a signal from the processor means,
wherein the tool conveyancing means comprises a tool holding device mounted on a moveable stage, and the moveable stage is mounted on a platform,
wherein the platform comprises one or more adjustable feet for adjusting the distance between the surface and the platform.

16. A micropositioning system comprising:
a radiation source for projecting an image onto a surface of an article, the image being part of a manufacturing template and the image representing a predetermined position on the surface of the article where a manufacturing or inspection operation is to be undertaken;
a radiation detector for detecting the projected image;
tool conveyancing means for carrying a tool adapted to perform manufacturing or inspection operations;
processor means for calculating at least two dimensional co-ordinates of the projected image detected by the radiation detector relative to the tool and
control means for controlling the tool conveyancing means so as to position the tool in a pre-defined spatial relationship with the projected image in response to a signal from the processor means,
wherein the micropositioning system comprises normalisation means for checking that the tool is substantially normal to the surface prior to a manufacturing operation being carried out;
wherein the normalisation means automatically controls at least one adjustable foot.

17. A micropositioning system comprising:
a radiation source for projecting an image onto a surface of an article, the image being part of a manufacturing template and the image representing a predetermined position on the surface of the article where a manufacturing or inspection operation is to be undertaken;

a radiation detector for detecting the projected image;

tool conveyancing means for carrying a tool adapted to perform manufacturing or inspection operations;

processor means for calculating at least two dimensional co-ordinates of the projected image detected by the radiation detector relative to the tool and control means for controlling the tool conveyancing means so as to position the tool in a pre-defined spatial relationship with the projected image in response to a signal from the processor means, wherein the tool conveyancing means comprises an extendable arm for holding a tool.

18. A method for accurately positioning tools comprising at least the steps of:

projecting an image onto a surface of an article, the image being part of a manufacturing template obtained directly from a CAD model of the article and the image representing a predetermined position on the surface of the article where a manufacturing or inspection operation is to be undertaken;

detecting the projected image processing the projected image calculating at least two dimensional co-ordinates of the projected image relative to a tool adapted to perform said manufacturing or inspection operation; and moving the tool so that it is positioned in a pre-defined spatial relationship with respect to the projected image.

19. A method as claimed in claim 18 wherein the precise location of the article relative to the radiation source is determined by known positioning techniques prior to projecting the image onto the surface of the article.

20. A method as claimed in, claim 18 wherein the tool is normalised prior to use so that in use its line of action is normal to the surface.

21. A method as claimed in claim 18 wherein the centre of the projected image is located during the processing of the projected image.

22. A method as claimed in claim 21 wherein two dimensional co-ordinates of the centre of the projected image relative to the tool are calculated by a processor.

23. A method as claimed in claim 22 wherein the processor sends a signal to a motion controller to cause the tool to be moved so that it is located at the same two dimensional co-ordinates as the centre of the projected image.

24. A method as claimed in claim 23, wherein the motion controller actuates a servo motor for moving the tool.

* * * * *